US007835726B2

(12) United States Patent
Qing et al.

(10) Patent No.: US 7,835,726 B2
(45) Date of Patent: Nov. 16, 2010

(54) SYSTEM AND METHOD OF PRESENTING ENTITIES OF STANDARD DEVICE APPLICATIONS IN WIRELESS DEVICES

(75) Inventors: Richard Qing, Ottawa (CA); Kenneth Wallis, Oakville (CA); Viera Bibr, Kilbride (CA); Cameron Bateman, Toronto (CA); Michael Shenfield, Richmond Hill (CA); Kamen Vitanov, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1142 days.

(21) Appl. No.: 11/405,510

(22) Filed: Apr. 18, 2006

(65) Prior Publication Data

US 2007/0083664 A1 Apr. 12, 2007

Related U.S. Application Data

(60) Provisional application No. 60/672,032, filed on Apr. 18, 2005.

(51) Int. Cl.
*H04M 3/42* (2006.01)

(52) U.S. Cl. .................. 455/414.1; 455/414.4; 455/418; 455/425

(58) Field of Classification Search .............. 455/414.1, 455/414.4, 418, 425
See application file for complete search history.

(56) References Cited

U.S. PATENT DOCUMENTS

| | | | |
|---|---|---|---|
| 6,823,495 B1 | 11/2004 | Vedula et al. | |
| 7,210,117 B2* | 4/2007 | Kudukoli et al. | ............ 717/100 |
| 7,437,614 B2* | 10/2008 | Haswell et al. | ............... 714/38 |
| 7,610,233 B1* | 10/2009 | Leong et al. | .................. 705/37 |
| 2002/0073396 A1* | 6/2002 | Crupi et al. | .................. 717/104 |
| 2002/0133635 A1 | 9/2002 | Schechter et al. | |
| 2003/0009747 A1 | 1/2003 | Duran | |
| 2003/0204517 A1* | 10/2003 | Skinner et al. | .............. 707/100 |
| 2004/0015833 A1* | 1/2004 | Dellarocas et al. | .......... 717/106 |
| 2006/0236302 A1* | 10/2006 | Bateman et al. | ............. 717/104 |
| 2006/0236307 A1* | 10/2006 | Debruin et al. | ............. 717/117 |

(Continued)

FOREIGN PATENT DOCUMENTS

WO 02017075 2/2002

(Continued)

OTHER PUBLICATIONS

XP-002478710—Article "An Overview of the PIM Optional Package" by Eric Giguere, Sep. 18, 2003.

(Continued)

*Primary Examiner*—Joseph H Feild
*Assistant Examiner*—Huy D Nguyen
(74) *Attorney, Agent, or Firm*—Mark Sprigings; Gowling Lafleur Henderson LLP (57) ABSTRACT

A data entity presentation system and method of presenting data entities of standard device applications in wireless devices are provided. The data entity presentation system comprises an application runtime environment module for hosting component-based applications on a device, an integrated development environment for hosting component definitions and a device repository for storing device data and device-specific application programming interfaces. The method comprises the steps of hosting component-based applications on a device, hosting component definitions and storing device data and device-specific application programming interfaces.

4 Claims, 10 Drawing Sheets

U.S. PATENT DOCUMENTS

2008/0005287 A1* 1/2008 Harvey et al. ............... 709/220

FOREIGN PATENT DOCUMENTS

WO 2004059939 A 7/2004

OTHER PUBLICATIONS

XP-002478711—Seminar Mobile Computing "Optional Packages"—JSR-75, JSR-179, JSR-120, JSR-205 by D. Gloor, Feb. 15, 2005.

XP-002478712—"Seminar Enterprise Computing WS 2005/05 Mobile Computing".

European Search Report on corresponding European Application No. 06721824 mailed Apr. 29, 2008.

PCT International Search Report and Written Opinion mailed Jul. 26, 2006 for corresponding PCT Application No. PCT/CA2006/000578.

Canadian Office Action Aug. 30, 2010.

* cited by examiner

SYSTEM AND METHOD OF PRESENTING ENTITIES OF STANDARD DEVICE APPLICATIONS IN WIRELESS DEVICES

This non-provisional application claims benefit to U.S. Provisional Application 60/672,032 filed on Apr. 18, 2005, which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The present invention relates generally to a communications system for providing communications to a plurality of devices and specifically to a system and method of presenting entities of standard device applications in wireless devices.

BACKGROUND

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

A wireless handheld device has limited battery power, memory and processing capacity. Since communication on a device is very expensive in terms of energy consumption, it is desirable to minimize resource use of the device as much as possible.

Devices from different manufacturers expose standard device application data entities (SDADEs) by providing their in-house application programming interfaces (APIs), which are usually not compliant to each other. Following the traditional way of developing a device application, a third party device application vendor tailors or re-develops applications on a per-device manner in order to use specific vendors' proprietary function calls to access SDADEs. Furthermore, for a specific device, the same piece of code has to be rewritten for each of its applications in order to access the device's SDADEs, which should be avoided by somehow sharing the code among these applications.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

A system and method of presenting data entities of standard device applications as built-in data components is provided. Standard device application data entities (SDADEs) include but are not limited to Contact, Email, Task (ToDo), which are usually exposed by their owner (standard) device applications to non-standard or user-developed device applications in the form of application programming interfaces (APIs).

In accordance with an embodiment of the present invention, there is provided a data entity presentation system for presenting data entities of standard device applications in wireless devices. The data entity presentation system comprises an application runtime environment module for hosting component-based applications on a device, an integrated development environment for hosting component definitions and a device repository for storing device data and device-specific application programming interfaces.

In accordance with another embodiment of the present invention, there is provided a method of presenting data entities of standard device applications in wireless devices. The method comprises the steps of hosting component-based applications on a device, hosting component definitions and storing device data and device-specific application programming interfaces.

In accordance with another embodiment of the present invention, there is provided a computer-readable medium storing instructions or statements for use in the execution in a computer of a method of presenting data entities of standard device applications in wireless devices. The method comprises the steps of hosting component-based applications on a device, hosting component definitions and storing device data and device-specific application programming interfaces.

In accordance with another embodiment of the present invention, there is provided a propagated signal carrier carrying signals containing computer-executable instructions that can be read and executed by a computer. The computer-executable instructions are used to execute a method of presenting data entities of standard device applications in wireless devices. The method comprises the steps of hosting component-based applications on a device, hosting component definitions, and storing device data and device-specific application programming interfaces.

Advantageously, presenting SDADEs as built-in data components of these non-standard device applications standardizes and simplifies the access to SDADEs. A device application with such built-in SDADEs can access standard data entities exposed by standard device applications in the same way as they access their own data components without conducting API function invocations, which are usually device-dependent.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

Figure 1:
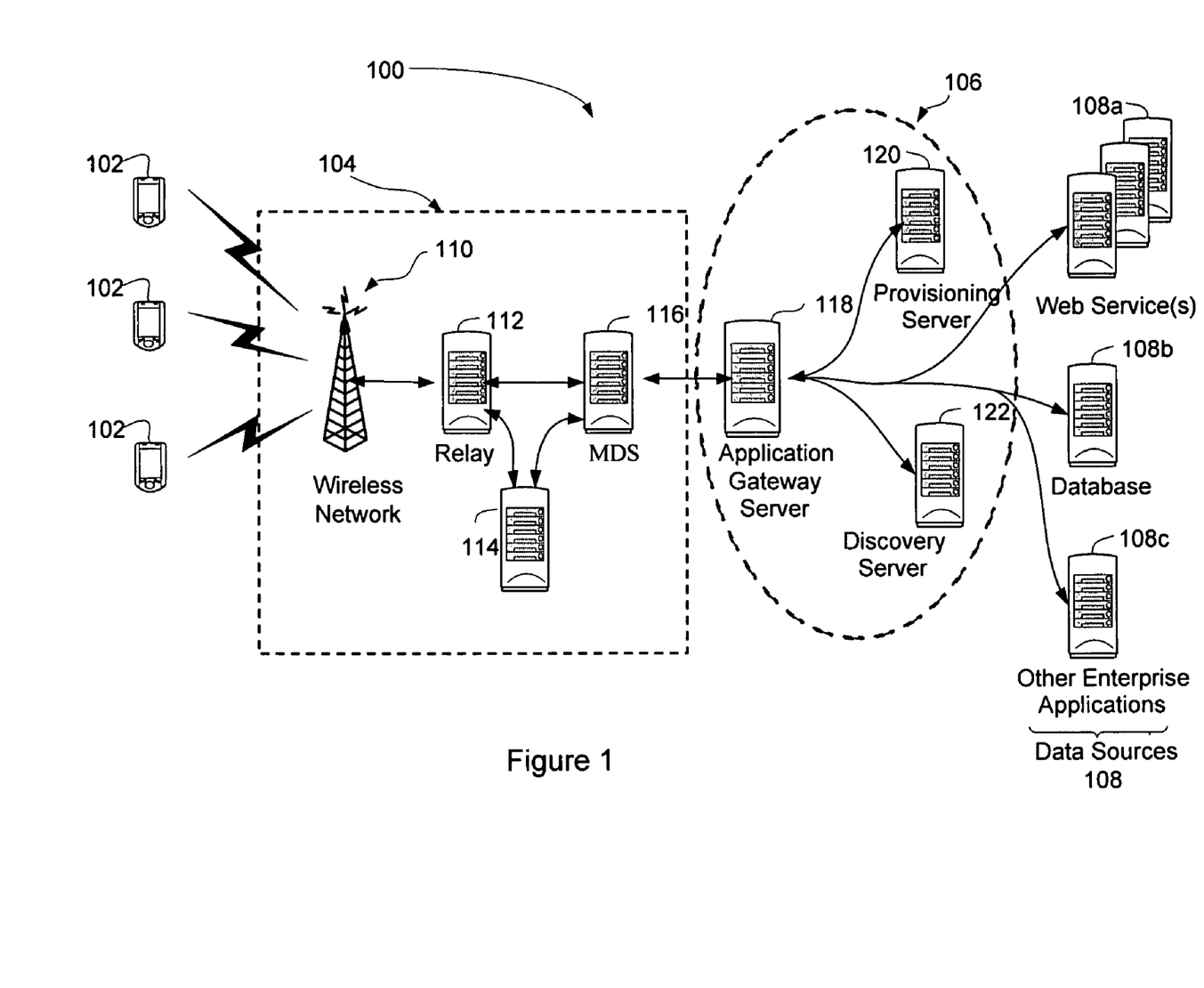
FIG. 1 is schematic diagram of an example of a network facilitating wireless component applications.

Referring to FIG. 1, an example of communication infrastructure is illustrated generally by numeral 100. The communication infrastructure 100 comprises a plurality of wireless devices 102, a communication network 104, an application gateway 106, and a plurality of backend services 108.

The wireless devices 102 are typical personal digital assistants (PDAs), but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. The details of the component applications are described at the end of this description.

The wireless devices 102 are in communication with the application gateway 106 via the communication network 104. Accordingly, the communication network 104 may include several components such as a wireless network 110, a relay 112, a corporate server 114 and/or a mobile data server 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the backend servers 108. The gateway server 118 is in communication with both the provisioning server 120 and the discovery server 122. The gateway server 110 is further in communication with a plurality of the backend servers 108, such as Web services 108a, database services 108b, as well as other enterprise services 108c, via a suitable link. For example, the gateway server 118 is connected with the Web services 108a and database services 108b via simple object access protocol (SOAP) and Java database connectivity (JDBC) respectively. Other types of backend servers 108 and their corresponding links can be connected to the gateway server 118.

Preferably, each wireless device 102 is initially provisioned with a service book or IT policy facility to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
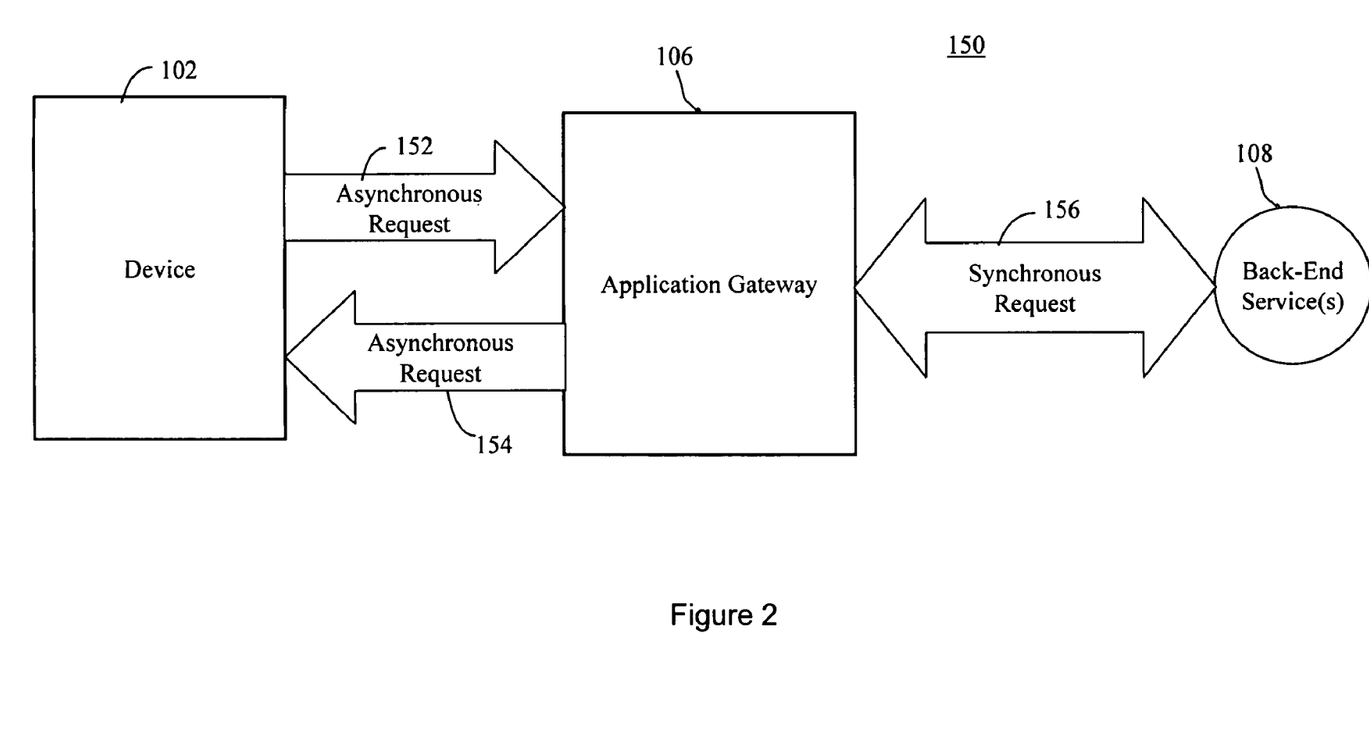
FIG. 2 shows in a flow diagram an example of a wireless component application communication model.

Referring to FIG. 2 there is illustrated in a flow diagram an example of a wireless component application communication model 150. From a high-level perspective, the overall wireless component application infrastructure 150 includes a wireless component application runtime environment (device RE) running on the device 102 and a wireless component application gateway (AG) 106 running on the server 118.

The AG 106 serves as a mediator between a wireless component application (sometimes referred to as application in this disclosure) executed by the RE and one or more back-end services 108 with which the application communicates. Often the back-end service is expected to be a Web service 108a using SOAP over HTTP or HTTPS as the transport protocol. As Web services are the most commonly expected back-end service 108, the term Web service is used interchangeable with back-end service 108 throughout this disclosure. However, it is appreciated that other types of back-end services can also be adapted to the disclosure. FIG. 2 exemplifies a synchronous link with a back-end service 108. However, it should be appreciated that the AG 106 can be in communication with back-end services 108 over asynchronous links.

The wireless component application communication model 150 is based upon an asynchronous messaging paradigm. In this model the application gateway (AG) 106 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device RE 102 and AG 106.

Figure 3:
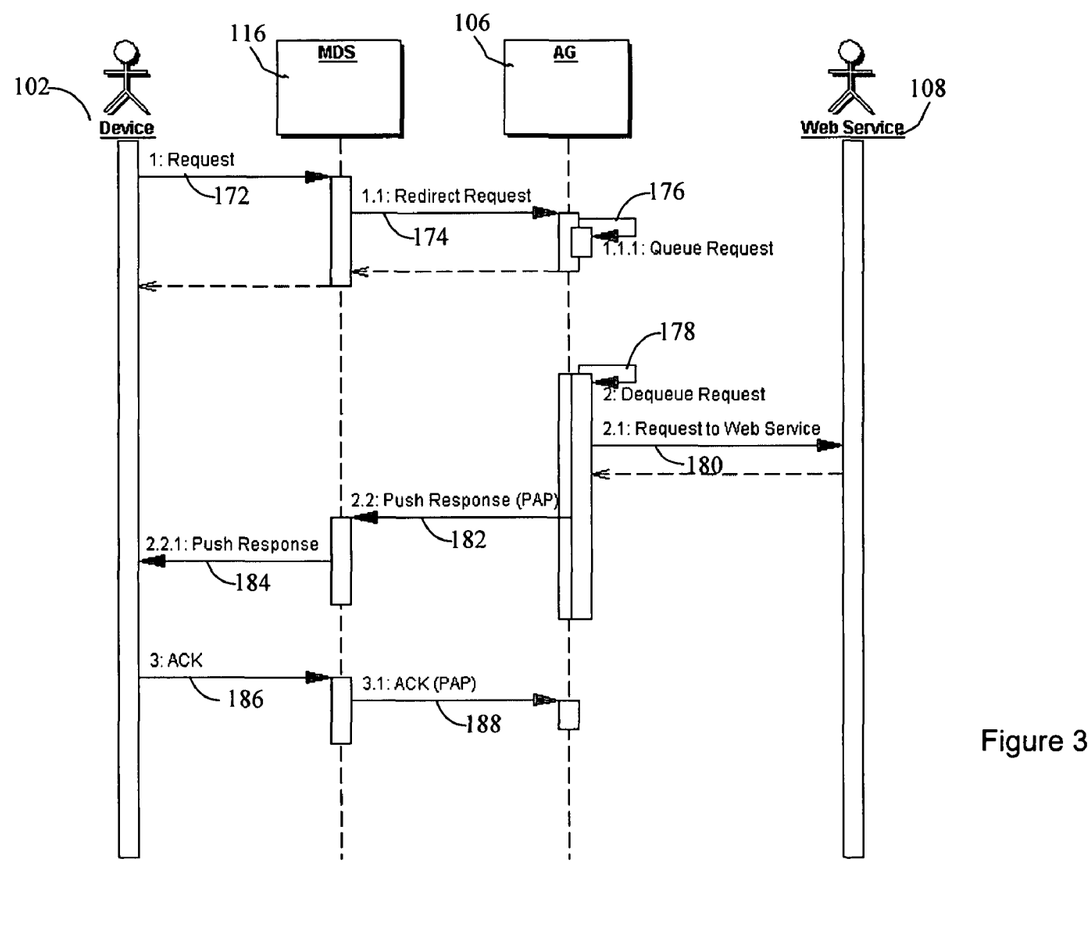
FIG. 3 shows in a sequence diagram an example of a communication sequence for the wireless component application model of FIG. 2.

Referring to FIG. 3 there is illustrated in a sequence diagram an example of a communication sequence for the wireless component application communication model of FIG. 2. The diagram describes the communications sequence between the device 102 and the back-end service(s) 108:

a. Upon receiving a request 172 from the device 102, via 174 MDS 116, AG 106 queues the request 176 and releases the connection to the device.
b. Next, the request is retrieved from the queue 178, pre-processed and forwarded 180 to the Web service 108 through a synchronous communication channel.
c. Any response from the previous request is processed by AG 106 and a response message is sent asynchronously 182 and 184 back to the device.

An application development tool generates an application bundle having the following structure:

Application Bundle Contents
    Mobile Application Definition
    Mobile Application Index of Data Sources
    Mobile Application Data Source Definitions
    Mobile Application Communication Mapping per Data Source Mobile Application Connectivity Information (Service Descriptor) per Data Source Mobile Application Definition—The application definition is the XML representation of the application, containing a data model (data types), a visual model (screens, layouts, menus, controls), a communication model (messages) and other resources. The communication model of the application aggregates the use of various data sources on the server side. To the runtime environment, the application communication is uniformly handled as if it is with just one data source.

Mobile Application Index of Data Sources—This is a list of the Data Sources participating in the application. The list refers to the data source definitions also included in the bundle.

Mobile Application Data Source Definitions—The application bundle contains one definition per data source. This defines the data source communication model (external API) and the data types used by it.

Mobile Application Communication Mapping—The application communication mapping defines the association between the application communication model and the data source communication model that needs to be used in order to effectively map the application data at runtime.

Mobile Application Connectivity Information (Service Descriptor)—The Service Descriptor contains information (e.g., credentials) necessary to connect to the data source in order to enable data flow (update data source, retrieve data from data source).

Data Source Mapping Loading Process—During application upload (installation) to a particular device, some portions of the application bundle are loaded by the server proxy and stored locally. The server proxy will later use this information at runtime, to serve the mobile application communication with the various data sources that it was built to communicate with.

Figure 4:
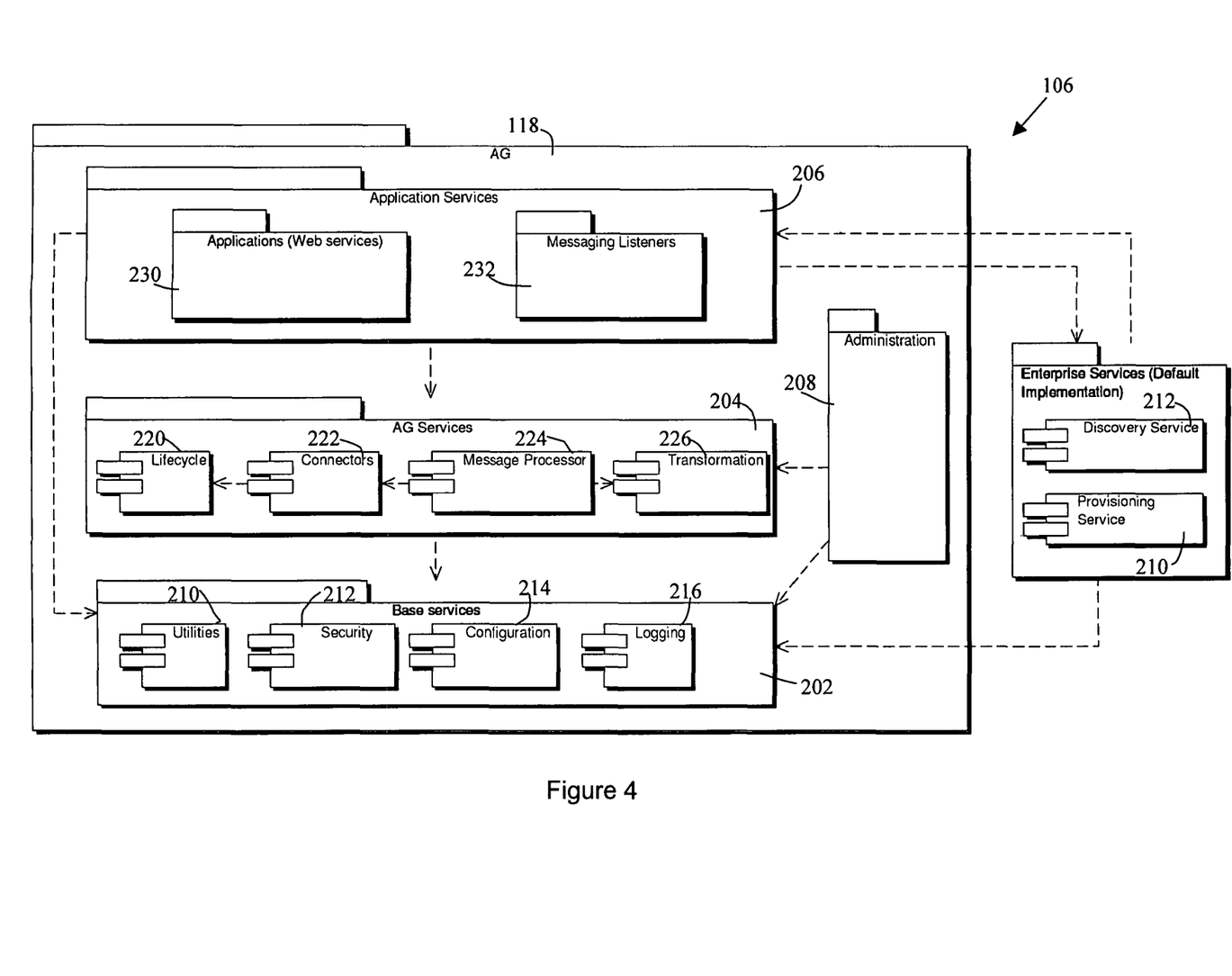
FIG. 4 shows in a detailed component diagram an example of the application gateway shown in FIG. 1.

Referring to FIG. 4, a more detailed view of an example of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain-independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain-specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application (or messaging listeners 232) provides an interface for receiving messages from the wireless devices 102 as well as external sources and forwarding them to the messaging subsystem. Further, the message listening application 232 typically authenticates that the source of the message is valid.

Figure 5:
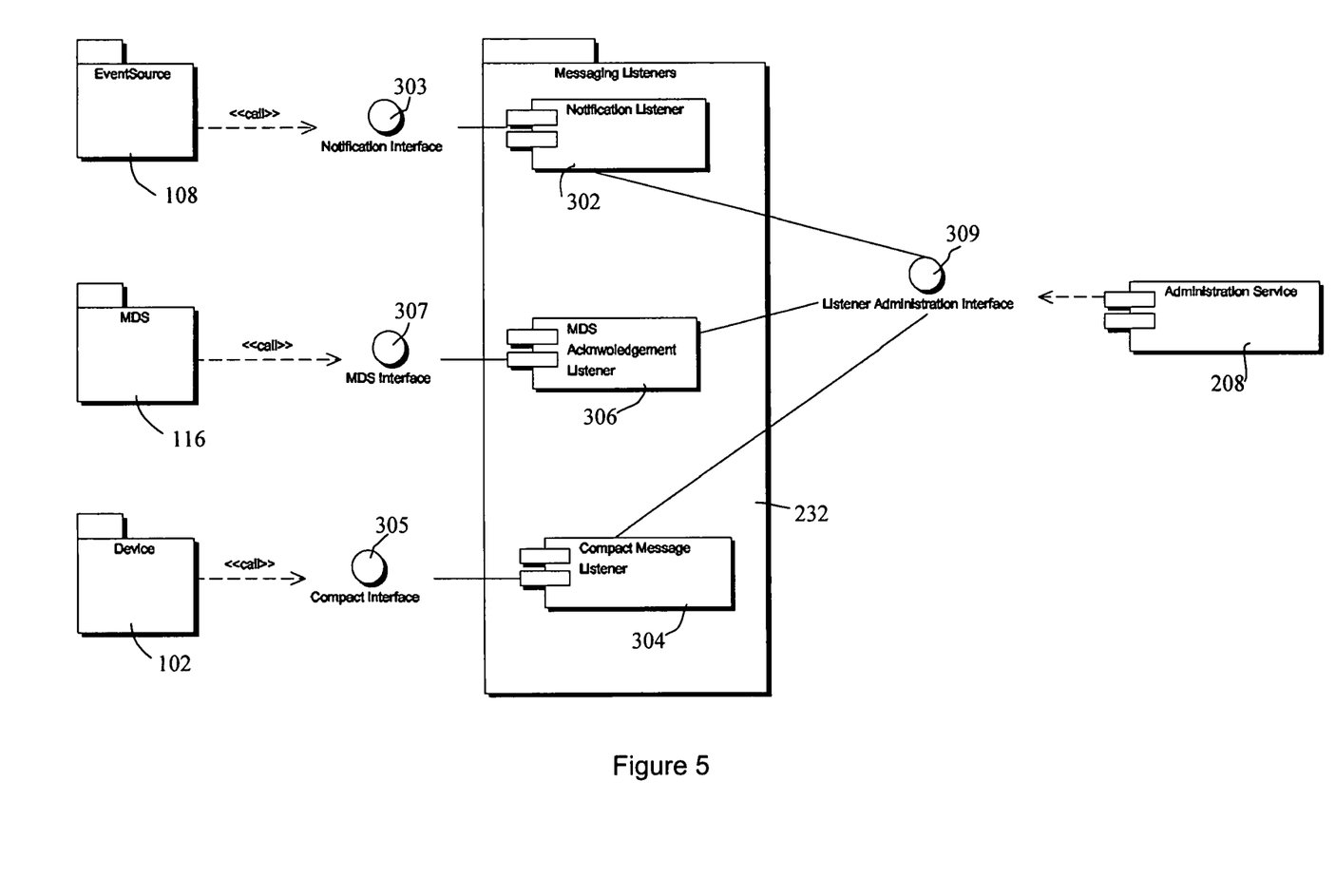
FIG. 5 shows in an interface diagram an example of a security subsystem.

Referring to FIG. 5, an example of the message listening application 232 is shown in greater detail. The message listening application 232 includes three listeners: a notification listener 302, a compact message listener 304, and a mobile data service acknowledgement listener 306. The notification listener 302 receives notification and response messages from event sources 108c via a notification interface 303. Other message listener interfaces may be added.

In one embodiment, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source, for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108, is valid.

Further, if reliable messaging is required, service availability is ensured and the listeners deal with solutions to availability attacks. In order to facilitate this, the messaging subsystem defines a threshold for a maximum number of messages and connections for a given time period from any backend server 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Figure 6:
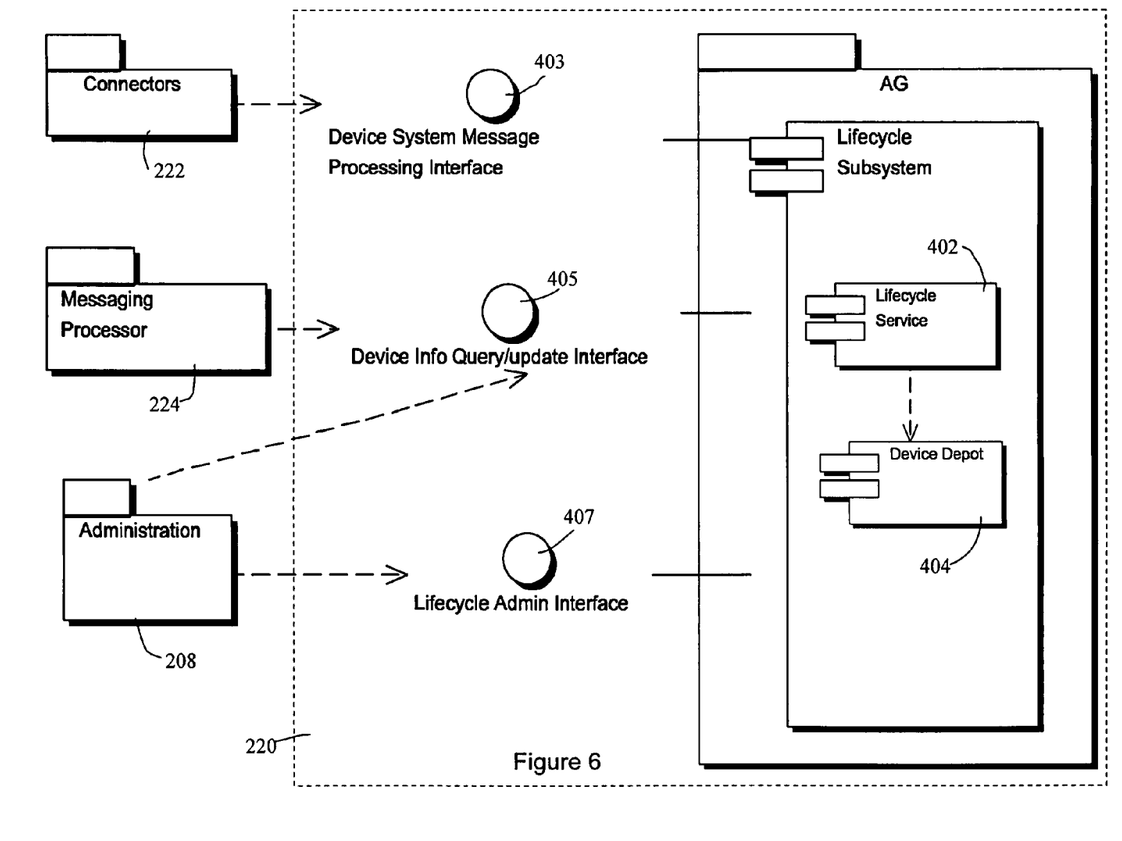
FIG. 6 shows in an interface diagram an example of the lifecycle subsystem in greater detail.

Referring to FIG. 6, an example of the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications satisfying certain modifiable criteria, and searching for devices satisfying certain modifiable criteria. For example, it may be desirable to determine which component applications are installed on all the wireless devices or which wireless devices have specific component applications installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the device depot 404. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Figure 7:
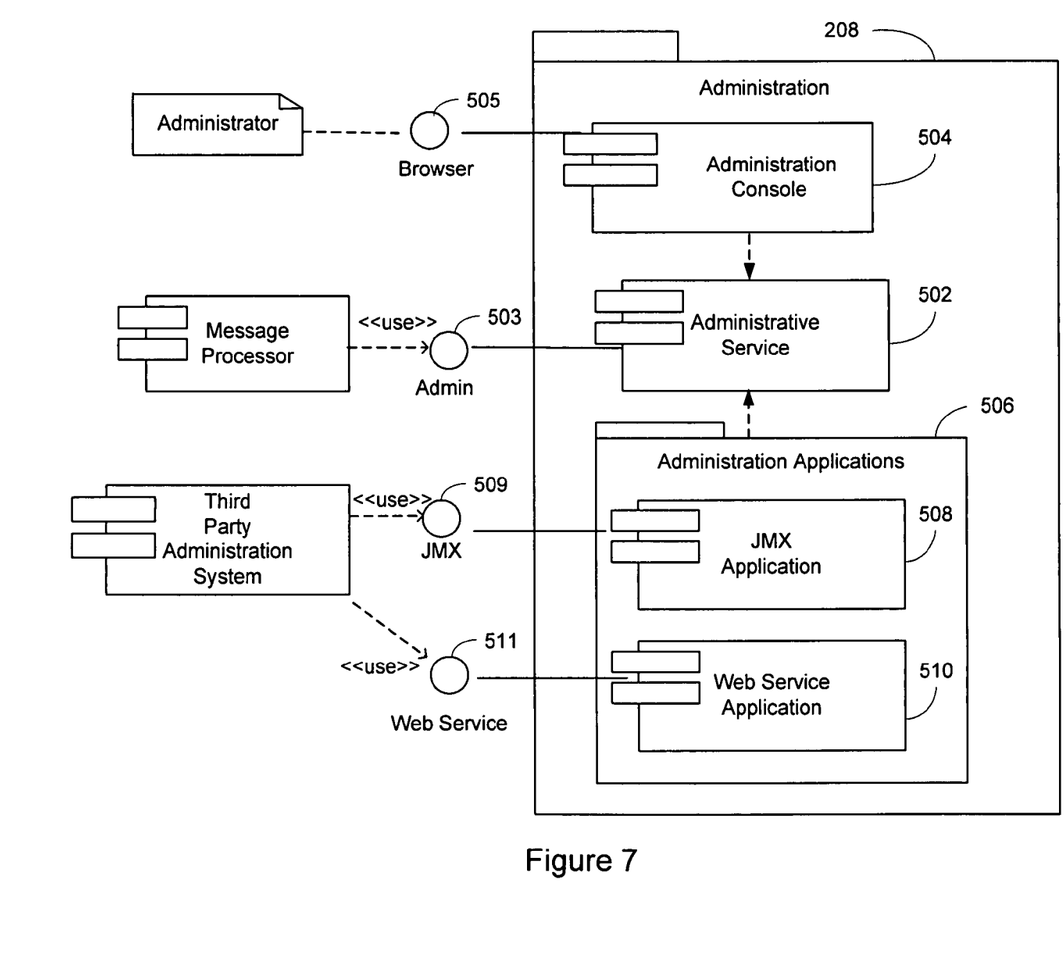
FIG. 7 shows in an interface diagram an example of the administration subsystem in more detail.

The administration subsystem 208 administers system messages, system devices, application gateway subsystems, system diagnostics, and default implementations of the provisioning and discovery services. Referring to FIG. 7, a more detailed view of an example of the administration subsystem 208 is shown. The administration subsystem 208 includes an administration service 502, an administration console 504 and administration applications 506. The administration applications 506 include a Java Management Extension (JMX) application 508 and a Web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the Web service application 510 is coupled via a Web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 104. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as querying a device for its component application and runtime environment settings and querying for component applications on specific devices.

The administration service 502 also provides the administrator with the ability to access application gateway subsystems runtime information and settings, per cluster node if applicable, and perform system-related tasks. Such tasks include viewing the message subsystem 224 runtime information, including message information per wireless device 12 and per component application, as well as the number of messages in queue, and a snapshot of the number of pooled objects of specific type. The administrator is able to modify specific settings at runtime as well as delete or reschedule expired messages.

Other information and settings provided by the administration service 502 includes the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The Web service application 510 uses Web services for directing service provider-initiated system messages to the administration service 502 for processing and delivery to device, if required.

Similarly, the JMX application 508 directs service provider initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects must be registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

A runtime environment framework container is a client-resident container within which applications are executed on a device. The container manages the application lifecycle on the device (provisioning, execution, deletion, etc.) and is responsible for translating the metadata (XML) representing an application into an efficient executable form on a device. The container provides a set of services to the application, as well as providing support for optional JavaScript. These services include support for UI control, data persistence and asynchronous client-server messaging, etc.

Figure 8:
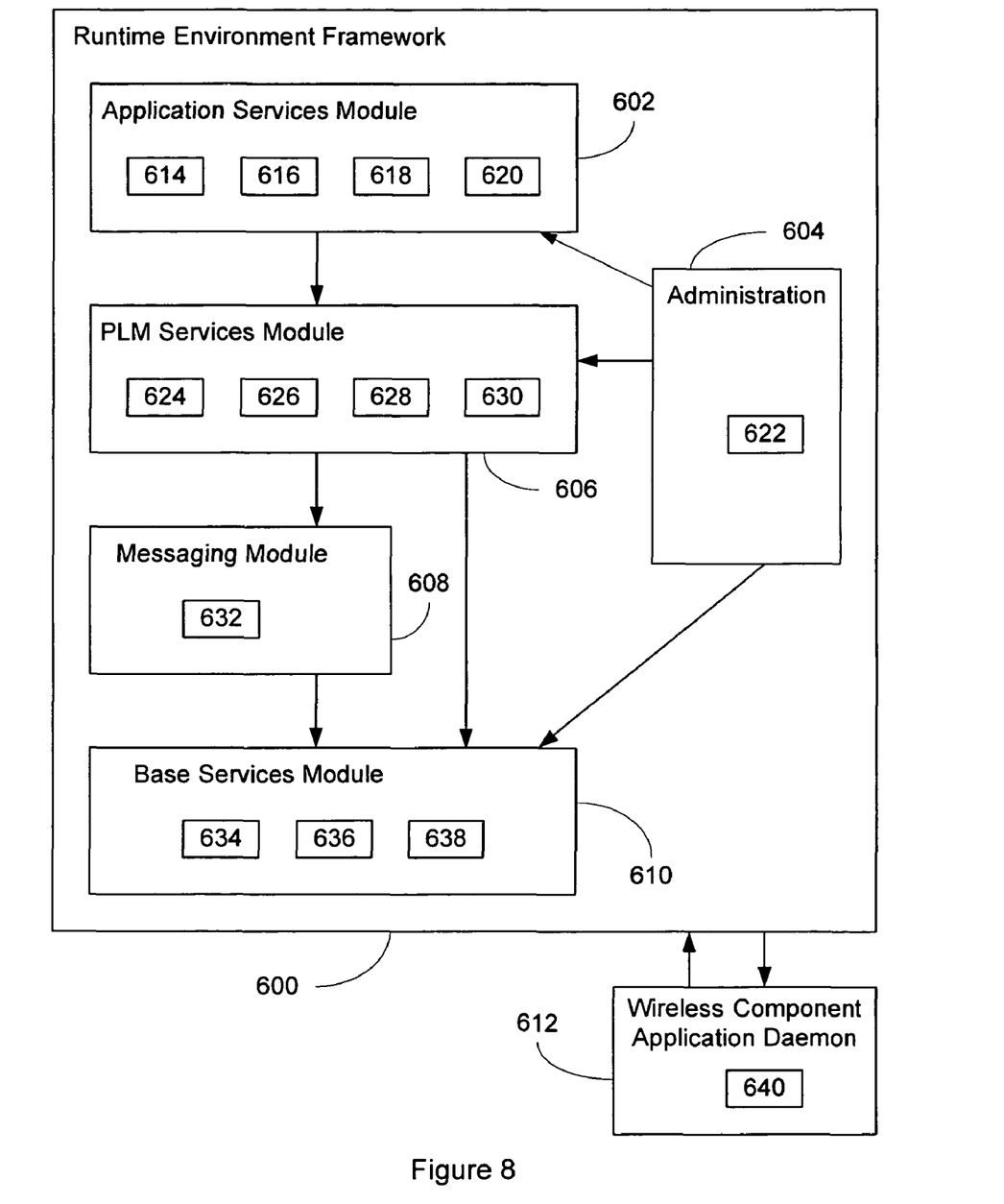
FIG. 8 shows in a component diagram an example of a runtime environment structure of the wireless component application.

FIG. 8 shows an example of a runtime environment framework 600. The runtime environment framework 600 comprises an application services module 602, an administration module 604, a provisioning and lifecycle management (PLM) services module 606, a messaging module 608, and a base services module 610. Components may be removed or added to the runtime environment framework 600. The runtime environment framework 600 communicates with a wireless component application daemon 612.

The application services module 602 includes a screen service 614 for providing an interface between currently running applications and a user, an interpreter service 616 for providing an execution environment for the applications, a metadata service 618 for handling and mediating application metadata related access, and an access service 620 for allowing applications to access other applications on the device 102.

The administration module 604 includes a control center 622 for handling a user interface of the wireless component application runtime environment framework 600, processing user interaction with the wireless component application runtime environment framework 600, and for integrating the wireless component application runtime environment framework 600 with the network system 100.

The PLM services module 606 includes a RE container 624 for coordinating RE container upgrades and backup/restore processes and for implementing a default error handling mechanism for the RE framework 600, a discovery service module 626 for locating applications in an application repository, a provisioning service 628 for application provisioning (including application downloads, installation and upgrades), and a lifecycle service 630 for registering, maintaining information for, and administrating applications.

The messaging module 608 includes a messaging service module 632 for message queuing, message (de)compacting, and message distribution.

The base services module 610 includes a persistence service 634 for storing a RE profile (including its version, directory, client administration policy, application administration policies, security keys, available upgrades, etc.), storing an application profile (including its version, metadata, application persistence data components, application persistable global data and application resource, available upgrades, etc.), and storing reliable messages (including outgoing messages pending delivery due to out of coverage, and incoming reliable messages pending processing). The base services module 610 also includes a securing service 636 for restricting access to RE services, providing message authentication, integrity, and encryption. The base services module 610 also includes a communication service 638 for sending and receiving messages in and out of the device 102, downloading resources and files from appropriate repositories, and notifying interested RE services about wireless coverage events.

The wireless component application daemon module 612 includes a daemon 640 for restarting the wireless component application process whenever it stops due to a fatal exception.

Figure 9:
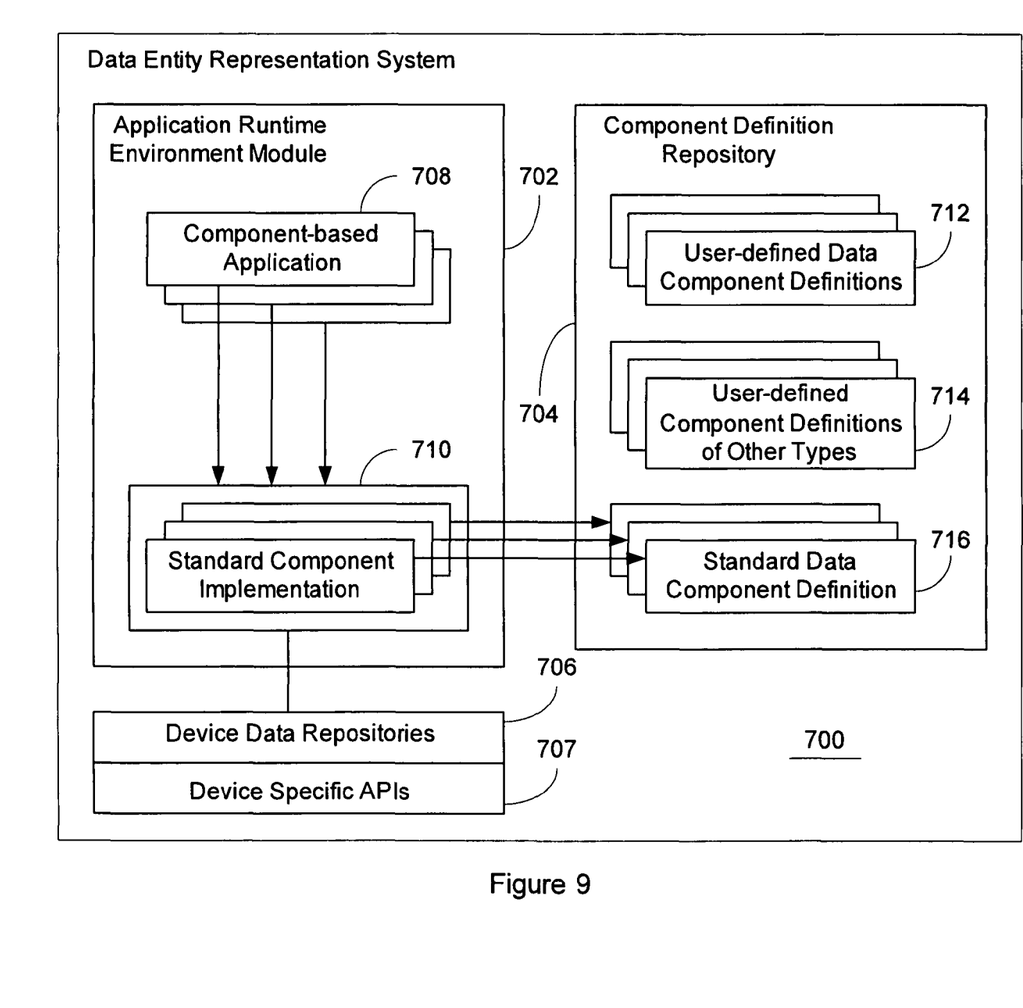
FIG. 9 shows an example of a data entity presentation system for presenting data entities of standard device applications in wireless devices, in accordance with an embodiment of the present invention.

FIG. 9 shows an example of a data entity presentation system 700 for presenting data entities of standard device applications in wireless devices, in accordance with an embodiment of the present invention. The data entity presentation system 700 comprises an application runtime environment (ARE) module 702 for hosting component-based applications on a device, an integrated development environment (IDE) 704 for hosting component definitions, and a device repository 706 for storing device data and/or device-specific application programming interfaces (APIs). One or more component-based applications (CBAs) 708 can run on the ARE 702. the ARE 702 comprises a set of one or more standard data component implementations 710 for implementing standard data component definitions. The IDE 704 comprises a set of user-defined data component definitions 612 for representing user-defined data that are application-specific, a set of user-defined component definitions of other types 714 for representing other types of components such as UI components for the application and message components for the application, and a standard data component definition 716 for representing standard built-in data component definitions.

A common set of standard data component definitions 716 is shared by the ARE module 702 and the IDE 704, as depicted in FIG. 9. An ARE module 702 on a specific device accommodates corresponding standard component implementations 708 of these definitions, which provide access to standard device application data entities (SDADEs) by invoking device-dependent APIs or making requests to device data repositories 606.

Figure 10:
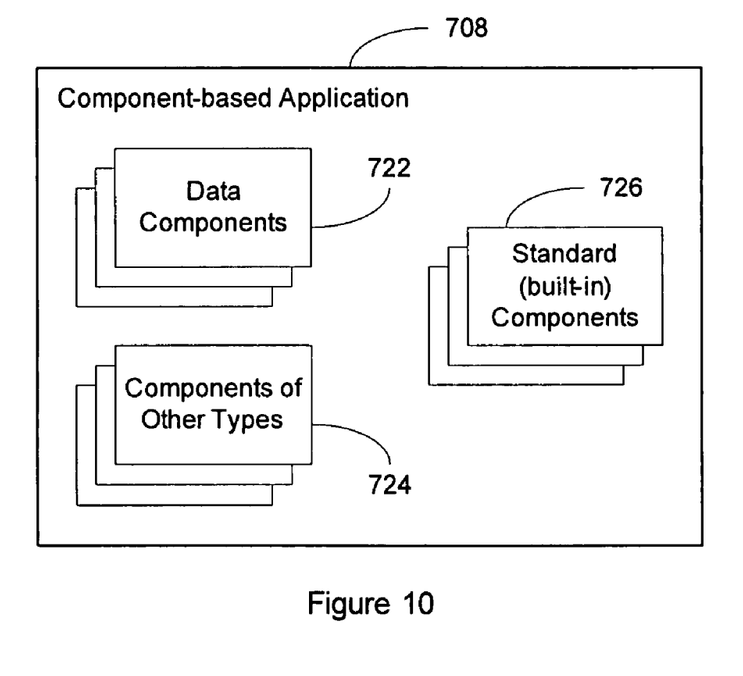
FIG. 10 shows an example of a component-based application, in accordance with an embodiment of the data entity presentation system.

FIG. 10 shows an example of a component-based application (CBA) 708, in accordance with an embodiment of the data entity presentation system 700. A CBA 708 is constructed in a component-based means such as an application design tool. For example, when a developer defines an application in the IDE 704, they define data components, UI components, message components and the interactions/relationship between them. Advantageously, using the data entity presentation system 700, an incoming message component can be defined such that upon the arrival of the incoming message, a new instance of data component would be created with the data that come with the message. Preferably, runtime elements of a CBA 708 are defined as components. In one embodiment, a CBA 708 comprises a data component 622 for representing data, components of other types 724 for representing components such as UI components and message components, and standard data components 626 for representing standard built-in data. Each component is of a specific type, which is associated with predefined behaviors or functions. For example, each data component could be created, deleted, updated, and its field values can be retrieved and/or set.

In one embodiment of a CBA 708, types of components for an application include: (i) data having behaviors to create, remove, load, persistent, update, and other data operations; (ii) messages having a send behavior; and (iii) a screen having behaviors to display, refresh, close, and other screen related operations. With respect to a data component 722, along with the aforementioned behaviors for individual data components 722, a search function may be available to a set of data components 722, or a data collection. Preferably, the search function of data components is built-in into the ARE 702 and automatically available to all user-defined and standard data components—this means by representing these standard application data (e.g., Calendar, Task, etc.) as standard built-in data components in CBA 708 has another benefit: functions available for normal data components are automatically accessible by a standard data component. For example, a user can search for a Task without writing any extra code.

Standard data components (SDCs) 726 are built-in data components to a CBA 708. The definitions of SDCs (SDCDs 716) are standardized to a specific series of devices or devices of a specific manufacturer, and encompassed by the IDE 704 and ARE modules 702. A SDC 626 acts as a developer-defined data components, but is a "front-end" to the data of the associated device repository data or device APIs 706.

As shown in FIG. 9, the ARE module 702 and IDE 704 share a common set of standard data component definitions (SDCDs) 716. The ARE module 702 provides a runtime context and implementation of the SDCDs 716, while the IDE 704 offers application developers the facilities of accessing and embedding SDCDs 716 into the applications in the development stage. SDCDs of an ARE module 702 and an IDE 704 are to be in sync. Furthermore, a mechanism could be introduced into the IDE 704 to provide different versions of SDCDs 716 for different targeted ARE modules 702. For example, the mechanism can be implemented as a common set of Java™ interfaces or classes (if Java is being used), that are shared by the ARE 702 and the IDE 704. When the IDE 704 is dealing with devices that have different definitions of standard data, a configuration is introduced so the developer can choose which type of devices are the target platform for a specific application, allow for the standard definition for those specific devices to be used.

Advantageously, in a component based application 708, the access to a built-in data repository of a device is presented as a access to standard data components (SDC), thereby eliminating the need for additional and non-reusable (between device applications) code in each application as would be the case for a traditional application exposing the access as device APIs. Moreover, when developing a CBA 608 with built-in standard data components 726, a developer does not have to use platform-dependent APIs and implement corresponding code to access standard data repositories (e.g., Contact, Email, Task, etc.) as is usually inevitable for a traditional application. Advantageously, by operating on SDCs in a manner used for a normal data component, data in a standard repositories can be created, modified, deleted, and/or searched in a device-independent means.

Functions of an SDC that are not available through device application programming interfaces (APIs), can be incorporated into as behaviors or functions of data components, which automatically become available to SDCs 726. For example, in the development of CBA 708 with built-in SDCs 726, search functions can be defined and incorporated into data components, which become available to a SDC 726. For example, a Contact search function is usually not directly available through a device API. Without built-in SDCs 726, a developer has to implement the search function for each of device data repositories, and the code written is not sharable among device applications that require the same function.

Figure 11:
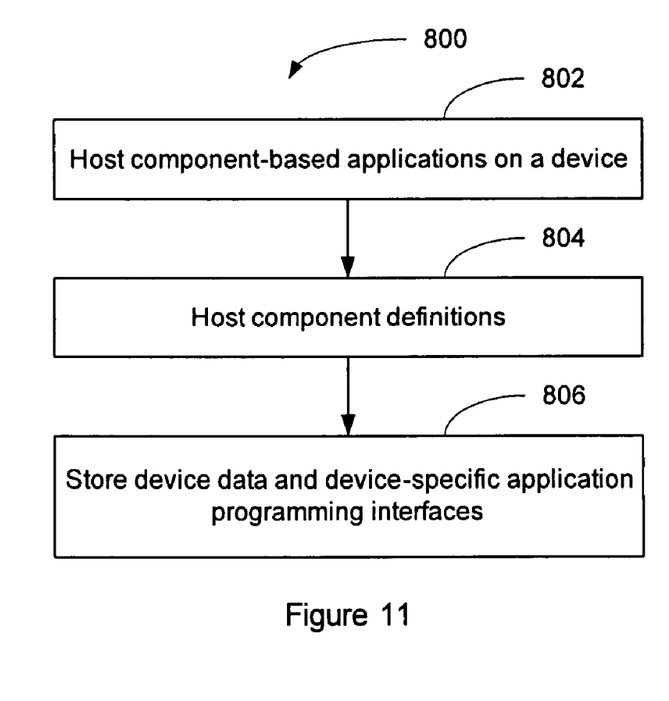
FIG. 11 shows in a flowchart an example of a method of presenting data entities of standard device applications in wireless devices, in accordance with an embodiment of the data entity presentation system.

FIG. 11 shows in a flowchart an example of a method of presenting data entities of standard device applications in wireless devices (800), in accordance with an embodiment of the data entity presentation system 700. The method (800) comprises the steps of hosting component-based applications on a device (802), hosting component definitions (804), and storing device data and/or device-specific application programming interfaces.

One example of a Contact application standard data component in an embodiment of the data entity representation system 700 is provided below. There are other possible implementations.

---

```
//Pseudo code of Contact - what fields a contact has
Struct Contact {
String nameTitle;
String nameGiven;
String nameFamily;
String address;
:
```

-continued

```
;
};
// Now the standard data component definition of it. Please note it
inherits DataComponentDefinition
// It would be used by ContactDataComponent
public class ContactCompDef extends DataComponentDefinition
{
    public final static String CONTACT_COMP_NAME = "Contact";
    public final static int NAME_TITLE_ID=0;
    public final static String NAME_TITLE="nameTitle";
    public final static int NAME_TITLE_TYPE=FieldTypes.STRING;
    public final static int NAME_GIVEN_ID=1;
    public final static String NAME_GIVEN="nameGiven";
    public final static int NAME_GIVEN_TYPE=FieldTypes.STRING;
    public final static int NAME_FAMILY_ID=2;
    public final static String NAME_FAMILY="nameFamily";
    public final static int NAME_FAMILY_TYPE=FieldTypes.STRING;
    public final static int HOME_ADDRESS_ID=3;
    public final static String HOME_ADDRESS="homeAddress";
    public final static int HOME_ADDRESS_TYPE=FieldTypes.DATA;
    :
    :
    :
    // then implement the interface functions of DataComponentDefinition
    public String[ ] getFieldNames( ) {
        ...
    }
    public int getNumFields( ) {
        ...
    }
    public int getFieldType(int fieldIndex) {
        ...
    }
    public int getAccessType(int fieldIndex) {
        ...
    }
}
public abstract class DataComponentDefinition {
    public abstract String[ ] getFieldNames( );
    public abstract int getNumFields( );
    public abstract int getFieldType(int fieldIndex);
    public int getAccessType(int fieldIndex) {
        ...
    }
...
}
// Implementation of Contact
// Based on the way the Device API is implemented, it may involves
synchronization operations between the
// native device repository and the standard data component
representation. E.g. loadContactFromDevice( ), e.g.
saveNewContactOrModifiedContactToDevice( ), etc.
// this provide interface functions to the ARE to handle this Contact
data component.
// Device APIs would be used here in order to access Contact data.
public class ContactDataComponent extends DataComponent {
    // optional - only override it if some specific operations needed here.
    public create( ) {
        ....
    }
    // optional - only override it if some specific operations needed here.
    public remove( ) {
        ....
    }
// would involve load Contact from the device native Contact repository
public load( ) {
...
}
// would involve save modified and/or new contact data component to
the device native Contact repository
public save( ) {
...
}
}
```

The data entity presentation system and methods according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A data entity presentation system for presenting data entities of standard device applications in wireless devices, the data entity presentation system comprising:
   an application runtime environment module for hosting at least one component-based application, and includes at least one standard component implementation for implementing standard data component definitions, the at least one component-based application comprising:
      a data component for representing application-specific data;
      a non-data component for representing non-data components; and
      a standard data component for representing standard built-in data on a device;
   an integrated development environment for hosting component definitions; and
   a device repository for storing device data and device-specific application programming interfaces;
   wherein the non-data component is a user interface component.

2. A data entity presentation system for presenting data entities of standard device applications in wireless devices, the data entity presentation system comprising:
   an application runtime environment module for hosting at least one component-based application, and includes at least one standard component implementation for implementing standard data component definitions, the at least one component-based application comprising:
      a data component for representing application-specific data;
      a non-data component for representing non-data components; and
      a standard data component for representing standard built-in data on a device;
   an integrated development environment for hosting component definitions; and
   a device repository for storing device data and device-specific application programming interfaces;
   wherein the non-data component is a message component.

3. A data entity presentation system for presenting data entities of standard device applications in wireless devices, the data entity presentation system comprising:
   an application runtime environment module for hosting component-based applications on a device;
   an integrated development environment for hosting component definitions comprising:
      at least one user-defined data component definition for representing application-specific user-defined data;
      at least one user-defined non-data component definition for representing non-data user components;
      at least one standard data component definition for representing standard built-in data components; and
   a device repository for storing device data and device-specific application programming interfaces;

wherein a user-defined non-data component of the at least one user-defined non-data component is a user interface component.

4. A data entity presentation system for presenting data entities of standard device applications in wireless devices, the data entity presentation system comprising:
  an application runtime environment module for hosting at least one component-based application, and includes at least one standard component implementation for implementing standard data component definitions, the at least one component-based application comprising:
    a data component for representing application-specific data;
    a non-data component for representing non-data components; and
    a standard data component for representing standard built-in data on a device;
  an integrated development environment for hosting component definitions; and
  a device repository for storing device data and device-specific application programming interfaces;
  wherein a user-defined non-data component of the at least one user-defined non-data component is a message component.

* * * * *